(12) United States Patent
Justiss et al.

(10) Patent No.: US 12,451,918 B2
(45) Date of Patent: Oct. 21, 2025

(54) FACE BARRIER COMMUNICATION SYSTEM, AN ATTACHABLE MICROPHONE AND SPEAKER FOR USE WITH THE SYSTEM, AND A COMMUNICATION APPLICATION FOR USE WITH THE SYSTEM

(71) Applicants: Joel Justiss, Colleyville, TX (US); Lisa Justiss, Colleyville, TX (US)

(72) Inventors: Joel Justiss, Colleyville, TX (US); Lisa Justiss, Colleyville, TX (US)

( * ) Notice: Subject to any disclaimer, the term of this patent is extended or adjusted under 35 U.S.C. 154(b) by 889 days.

(21) Appl. No.: 17/489,570

(22) Filed: Sep. 29, 2021

(65) Prior Publication Data

US 2022/0103200 A1 Mar. 31, 2022

Related U.S. Application Data

(60) Provisional application No. 63/084,936, filed on Sep. 29, 2020.

(51) Int. Cl.
| | |
|---|---|
| *H04B 1/3827* | (2015.01) |
| *H04R 1/02* | (2006.01) |
| *H04R 1/08* | (2006.01) |
| *A41D 13/11* | (2006.01) |
| *H04W 4/80* | (2018.01) |

(52) U.S. Cl.
CPC .............. *H04B 1/385* (2013.01); *H04R 1/025* (2013.01); *H04R 1/083* (2013.01); *A41D 13/11* (2013.01); *H04B 2001/3866* (2013.01); *H04R 2420/07* (2013.01); *H04W 4/80* (2018.02)

(58) Field of Classification Search
CPC ............ H04B 1/385; H04B 2001/3866; H04R 1/025; H04R 1/083; H04R 2420/07; H04W 4/80; A41D 13/11
See application file for complete search history.

(56) References Cited

U.S. PATENT DOCUMENTS

| 2014/0113615 A1* | 4/2014 | Yao ................... H04M 1/72412 |
| | | 455/418 |
| 2023/0059427 A1* | 2/2023 | Yin ........................ H04R 5/033 |

FOREIGN PATENT DOCUMENTS

| CN | 110381485 A | * 10/2019 | ........... G06F 17/289 |

OTHER PUBLICATIONS

Gecko & Fly; published Jan. 8, 2020; https://web.archive.org/web/20200816101934/https://www.geckoandfly.com/22562/chat-without-internet-connection-mesh-network/ (Year: 2020).*

(Continued)

*Primary Examiner* — Mark Fischer (57) ABSTRACT

The disclosure provides a communication system that can be used with a face barrier to improve communication. The communication system can connect two communication devices via a short range wireless network, such as a Bluetooth compliant connection. The communication system can include, for example: (1) a microphone and (2) a first computing device configured to receive a first audio signal from the microphone and transmit the first audio signal to a speaker of a second computing device, and configured to receive a second audio signal from a microphone of the second computing device via the short range wireless system and transmit the second audio signal to a speaker associated with the first computing device, wherein each receive and transmit is via a short range wireless communication system. A protective device for a user is also disclosed.

17 Claims, 9 Drawing Sheets

(56) References Cited

OTHER PUBLICATIONS

English machine translation of CN-110381485-A (Gao et al.; Bluetooth communication method, TWS Bluetooth earphone and terminal; published Oct. 2019) (Year: 2019).*
"Sound-powered telephone"; Wikipedia; Jul. 2013; 3 pages.

* cited by examiner

FACE BARRIER COMMUNICATION SYSTEM, AN ATTACHABLE MICROPHONE AND SPEAKER FOR USE WITH THE SYSTEM, AND A COMMUNICATION APPLICATION FOR USE WITH THE SYSTEM

CROSS-REFERENCE TO RELATED APPLICATION

This application claims the benefit of U.S. Provisional Application Ser. No. 63/084,936, filed by Joel Justiss, et al. on Sep. 29, 2020, entitled "A FACE BARRIER COMMUNICATION SYSTEM, AN ATTACHABLE MICROPHONE AND SPEAKER FOR USE WITH THE SYSTEM, AND A COMMUNICATION APPLICATION FOR USE WITH THE SYSTEM," commonly assigned with this application and incorporated herein by reference in its entirety.

TECHNICAL FIELD

This application is directed, in general, to assisting communication and, more specifically, to improving communication when wearing a face barrier.

BACKGROUND

Due to health concerns, people are often encouraged to wear a face barrier to block the transmission of droplets from the nose or mouth of one person to another person. For example, face masks and/or shields are encouraged to be warn to reduce the spread of viruses, such as COVID-19. Wearing such face barriers, however, can greatly reduce communication between people due to the face barrier muffling the spoken words of a person.

SUMMARY

In one aspect, a face barrier communication system is disclosed. In one example, the face barrier communication system includes: (1) a microphone located on a face-side of a face barrier, and (2) a speaker at least partially located on a public side of the face barrier, wherein at least part of the face barrier communication system is physically connected to a face barrier.

In another aspect, a communication system is disclosed. In one example, the communication system includes: (1) a microphone, and (2) a first computing device configured to receive a first audio signal from the microphone and transmit the first audio signal to a speaker of a second computing device, and configured to receive a second audio signal from a microphone of the second computing device via the short range wireless system and transmit the second audio signal to a speaker associated with the first computing device, wherein each receive and transmit is via a short range wireless communication system.

BRIEF DESCRIPTION

The disclosure may be understood by reference to the following detailed description taken in conjunction with the drawings briefly described below.

DETAILED DESCRIPTION

Figure 1A:
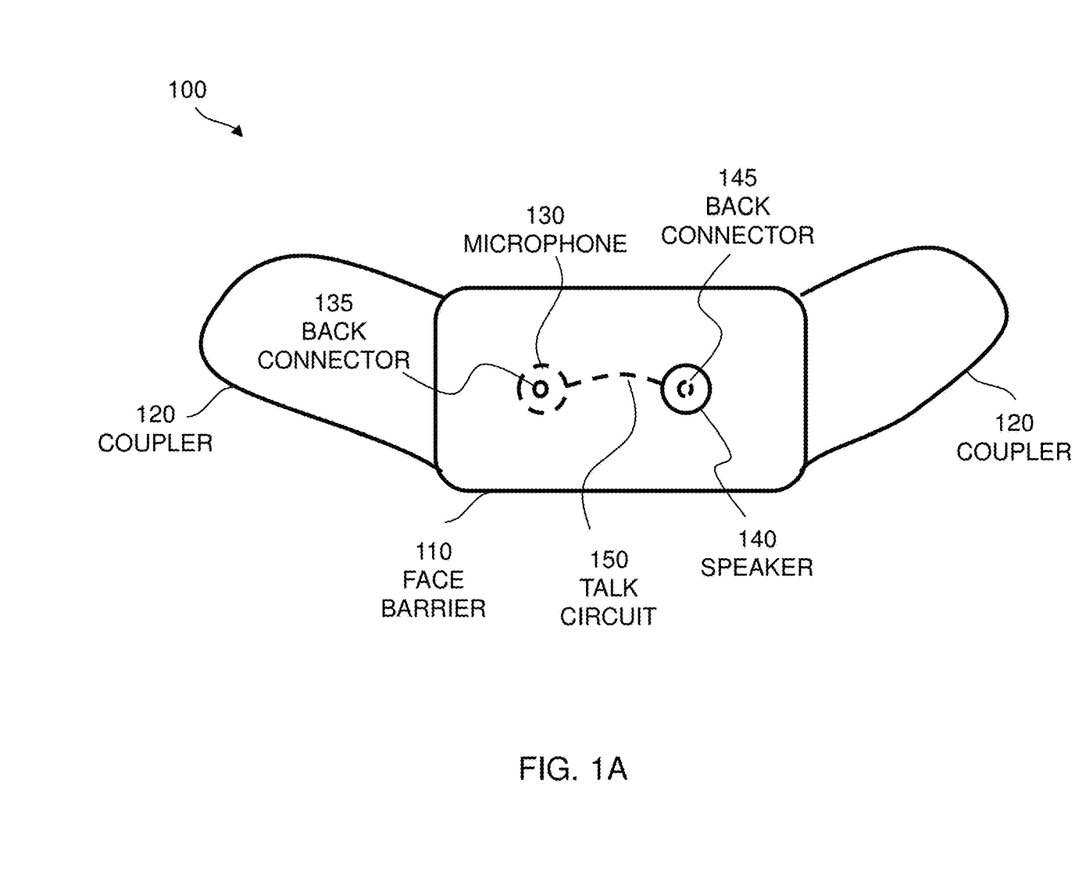
FIG. 1A illustrates a diagram of an example of a face barrier communication system constructed according to the principles of the disclosure.

The disclosure provides a communication system that overcomes, or at least reduces, the muffling of sound (i.e., anything audible) from a user wearing a face barrier, such as coming out of a user's mouth. The face barrier communication system includes a first sound transducer that converts sound from a user (e.g., spoken words from a user) to electrical signals, a second sound transducer that receives the electrical signals and converts them to audio, and a talk circuit that communicates the electrical signals from the first sound transducer to the second sound transducer. The electrical signals are an example of sound signals. The first sound transducer, also referred to as a microphone, is located on a face side of a face barrier and the second sound transducer, also referred to as a speaker, is located on the public side (e.g., non-face side) of the face barrier. The microphone receives the sound from the user and delivers the sound via electrical signals to the speaker, which then converts the electrical signals to audio, which is provided with reduced or possibly no muffling from the face barrier. The microphone and the speaker can be attached to the face barrier individually such as shown in FIG. 1A and FIG. 1C. Different type of removeable (non-permanent) connections can be used. FIG. 1A shows an example for connecting the microphone and/or speaker to the face barrier using a pin type connector with a back connector.

Figure 3:
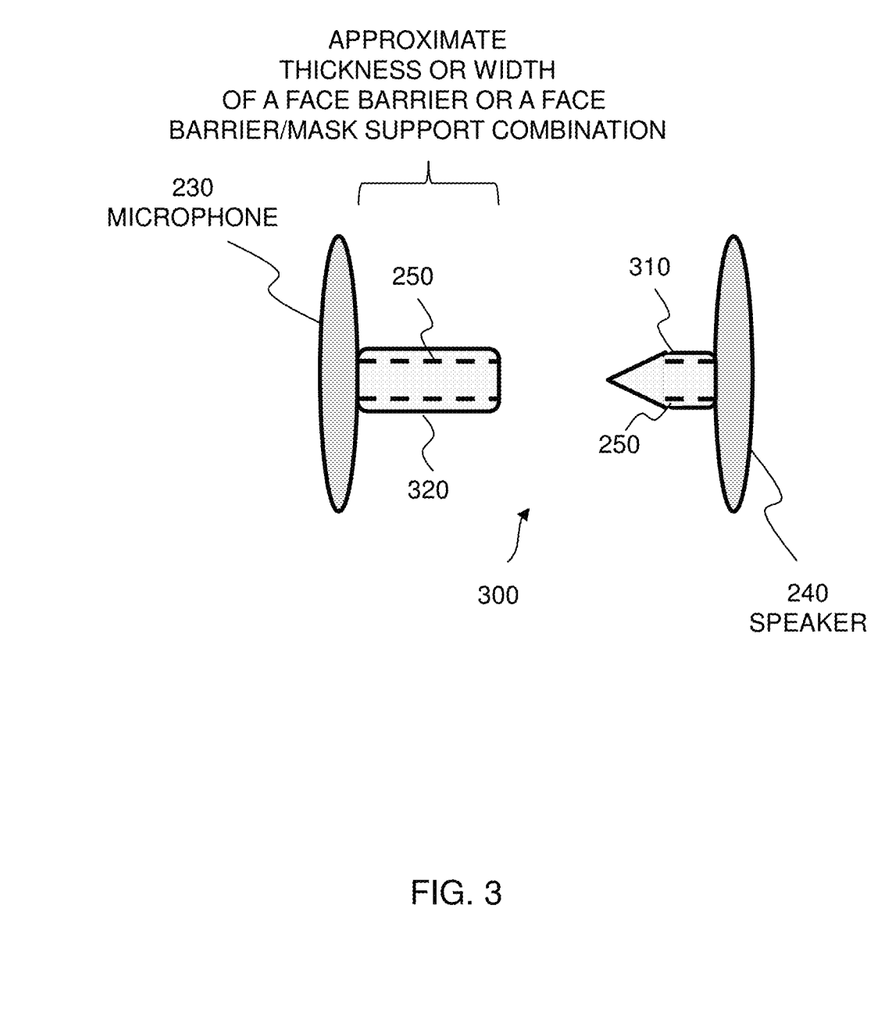
FIG. 3 illustrates a diagram of an example of connecting a microphone and speaker together through a face barrier according to the principles of the disclosure.
Figure 4:
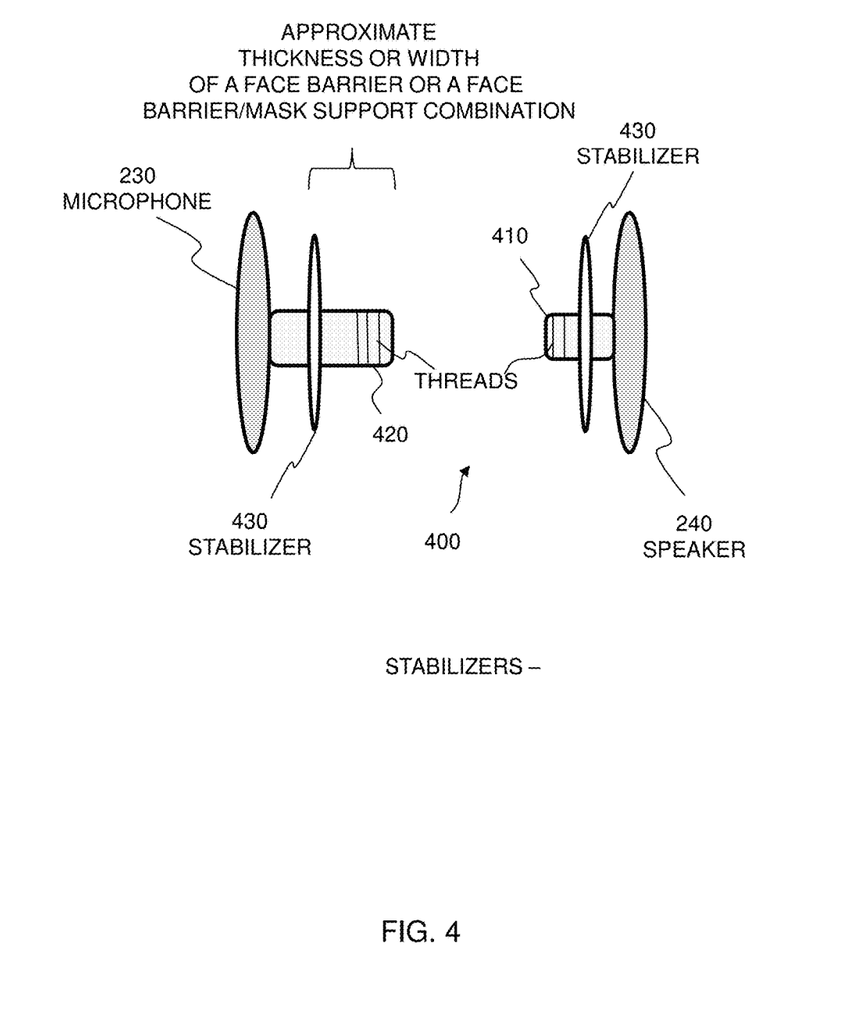
FIG. 4 illustrates a diagram of another example of connecting a microphone and speaker together through a face barrier according to the principles of the disclosure.
Figure 5:
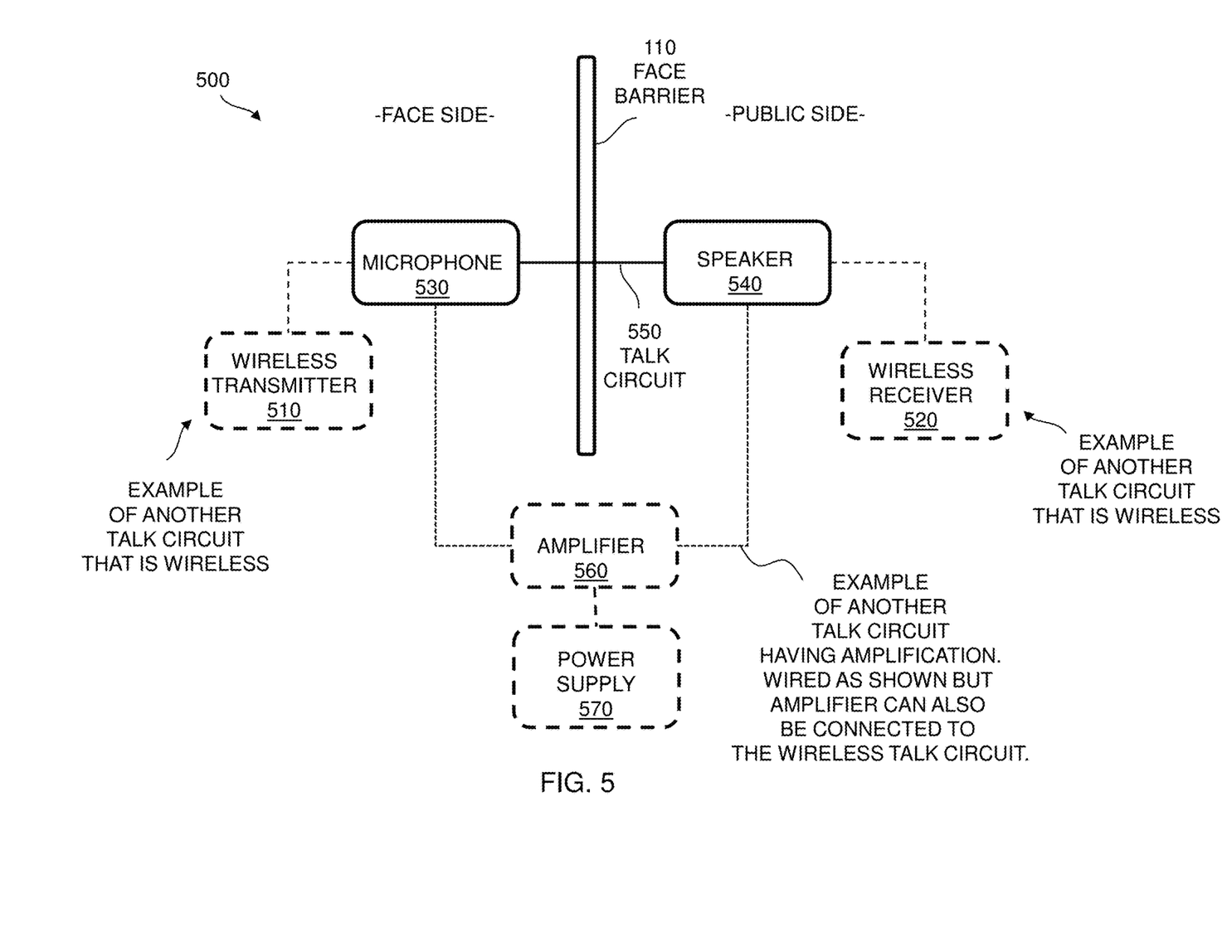
FIG. 5 illustrates a block diagram of an example of a face barrier communication system for use with a face barrier and constructed according to the principles of the disclosure

The microphone and speaker can be non-powered components that convert sound to electrical energy and the electrical energy to sound or audio. Audio is anything audible that has been processed or produced or recorded by electronic or digital components. Directional current components can be used to prevent the flow of electrical signals from the speaker to the microphone. When the talk circuit is hardwired, the directional components can be diodes that can be part of the talk circuit or can be part of the speaker or microphone in which the talk circuit connects. With a wireless talk circuit, one way communication can be set up that flows from the microphone to the speaker and prevents or at least limits the flow of sound from the speaker to the microphone. The microphone and speaker can be dynamic transducers that use a diaphragm and magnet to convert the sound to electrical energy and the electrical energy back to sound. Other types of sound transducers can also be used. In some example, the electrical signals can be amplified using an amplifier. A power supply to provide amplification power can also be used, such as a battery. As shown in FIGS. 1A-5, the talk circuit can be a hardwired connection. In some examples, the talk circuit can be a wireless connection to provide more flexibility with the location of the speaker, and possibly even the microphone. As such, the power supply would also provide power for the wireless communication using, for example, a wireless transmitter with the microphone and a wireless receiver with the speaker. FIG. 5 illustrates a block diagram of an example of a communication system that shows an amplifier, power supply, wireless transmitter, and wireless receiver as additional components that can be used.

The microphone is typically positioned a distance away from a user's mouth to ensure capture of the exiting sound, e.g., spoken words or song, with minimal interference. Though not illustrated, in the various examples disclosed herein, a pop screen and/or pop filter can be used with the microphones. A support, such as a mask support, can also be used to create space between the mouth (or lips) of a user. A conventional mask support can be used. Another type of extension, such as an arm(s) connected to the base of the microphone that extends toward a user's face, can be used to create space. In some examples, one or more of the microphone and speaker can be affixed to the mask support that provides separation between a user's face, such as their mouth, and a face barrier. In some examples, one or more of the microphone and speaker can be permanently attached to the support. Additionally, the microphone can be attached to the side or edge of a face barrier; similar to how the speaker of FIG. 1C is attached. Overall, the communication system is sized to allow connection or positioning, of at least the microphone, on the face-side of a face barrier. The transducers used for the microphone and speaker can be microtransducer, such as microspeakers.

The talk circuit can be two or more electrical conductors connecting the microphone to the speaker. The talk circuit can go from the microphone, through the face barrier, to the speaker. The length of the talk circuit can vary depending on, for example, the location of the speaker from the microphone. In some examples, the talk circuit can attach to the speaker without going through the face barrier. The speaker may be attached, for example via a clip or pin, to a side of a face barrier as shown in FIG. 1C.

FIGS. 1A and 1C provide examples that include a talk circuit having flexible connectors, such as wire. FIG. 1A illustrates a diagram of an example of a face barrier communication system 100 constructed according to the principles of the disclosure. The face barrier communication system 100 is associated with face barrier 110 and includes couplers 120, a microphone 130, a speaker 140, and a talk circuit 150.

The face barrier 110 is configured to cover at least the nose and mouth of a user. In FIG. 1A a mask is used as an example for the face barrier. Another type of barrier could also be used, such as a shield, bandana, neck gaiter, etc.

The couplers 120 are configured to position the face barrier 110 in front of the nose and mouth of a user. In FIG. 1A straps that go around the user's ears are shown as couplers. Other types can also be used, such as an adhesive, a neck support, a head support, etc.

The microphone 130 is a sound transducer that converts sound pressure from a user's voice into an electric current. The microphone 130 can be located on the face side of the face barrier 110. The microphone 130 can be a conventional microphone.

The speaker 140 is a sound transducer that converts electric current back to sound. The speaker 140 is located on the public side of the face barrier 110. The speaker 140 can be a conventional speaker.

The microphone 130 is communicatively connected to the speaker 140 via the talk circuit 150. The talk circuit 150 includes an electrical conductor (or conductors) that carry converted sound pressure to the speaker 140. The talk circuit 150 can be at least partially located on the face side of the face barrier 110.

The microphone 130 and speaker 140 are secured to the face barrier 110 via connector combination that includes, for example, a back connector and a pin connector. In FIG. 1A, back connector 135 is used to connect microphone 130 to the face barrier 110 and back connector 145 is used to connect speaker 140 to the face barrier 110.

Figure 1B:
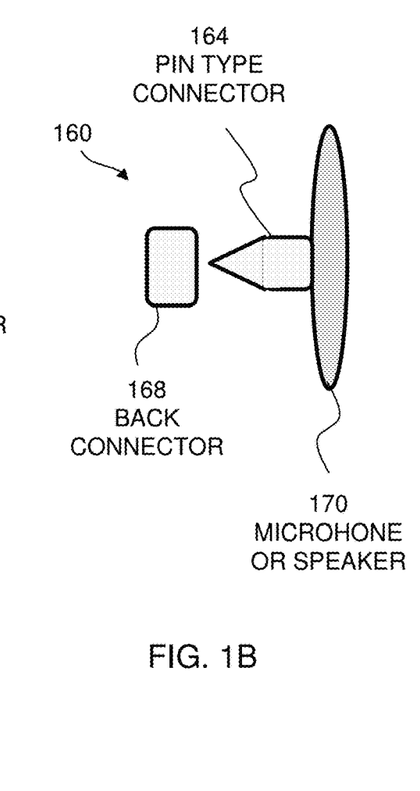
FIG. 1B illustrates a diagram of an example of a connector combination that can be used with a microphone and speaker according to the principles of the disclosure.
Figure 1C:
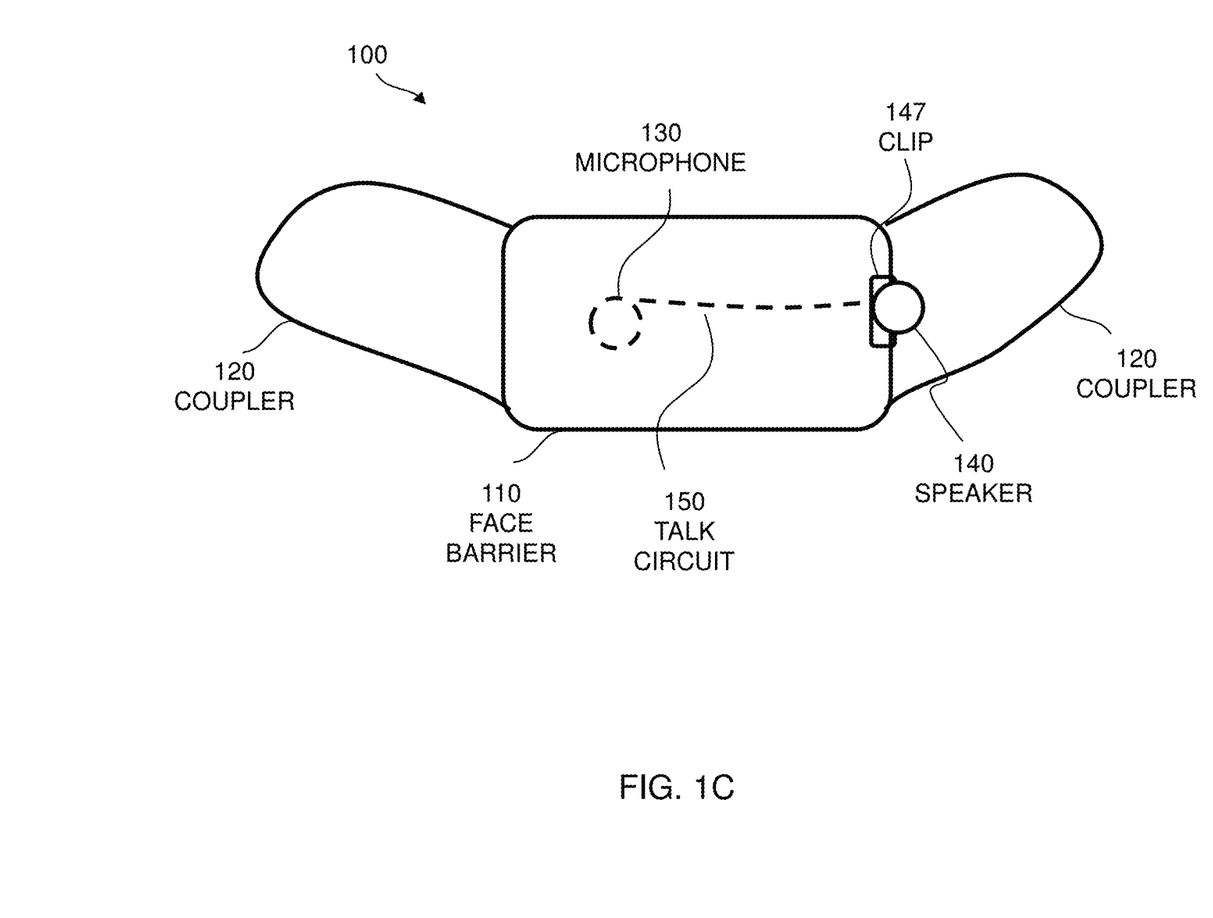
FIG. 1C illustrates a diagram showing an example of a location of a speaker on a face barrier according to the principles of the disclosure.

FIG. 1B illustrates a diagram of an example of a connector combination 160 that can be used with microphone 130 and speaker 140. The connector combination 160 includes a pin connector 164 and a corresponding back connector 168. The connector combination 160 is used to secure a microphone or a speaker, represented by element 170, to a face barrier, such as face barrier 110. The microphone or speaker 170 can be, for example, either one or both of microphone 130 and speaker 140.

FIG. 1C illustrates a diagram of face barrier communication system 100 showing another example of an alternate location of speaker 140 on face barrier 110 according to the principles of the disclosure. In FIG. 1C, speaker 140 is connected to face barrier 110 via a clip 147. The clip 147 can be one of multiple types of clips that secure speaker to the side or edge of face barrier 110. The talk circuit 150 can have a sufficient length to allow the speaker 140 to be moved to different locations along the edge of the face barrier 110 or even to other locations, such as a collar of a user. Instead of a clip, another connector, such as a pin, can be used.

Figure 2:
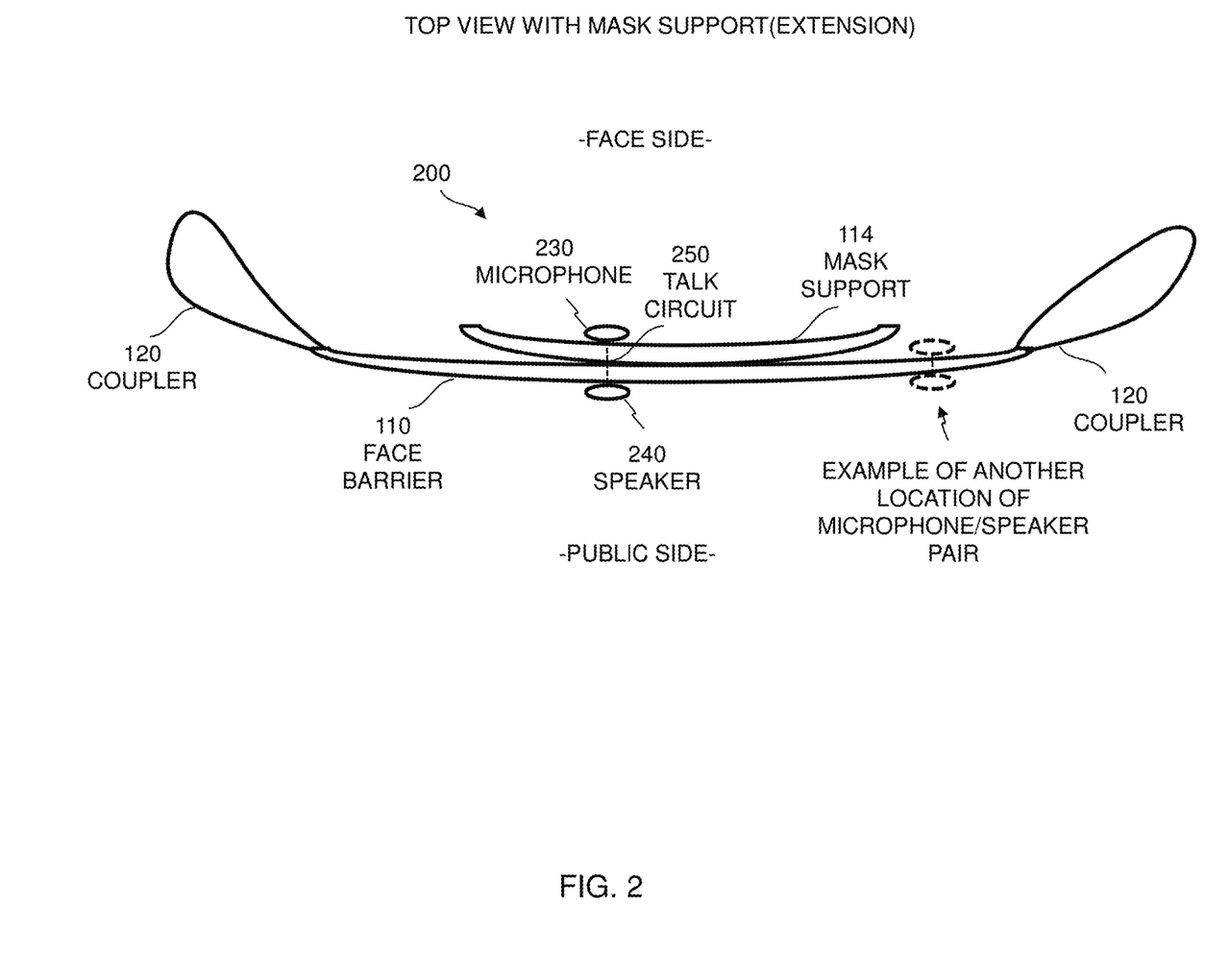
FIG. 2 illustrates a diagram showing a top view of a face barrier with a mask support and a face barrier communication system constructed according to the principles of the disclosure.

In some examples, the talk circuit can be rigid or part of a rigid connector and can both mechanically and electrically connect the microphone to the speaker. FIGS. 2-4 provide examples. The location of the male and female connectors can vary. For example, in contrast to the example of FIGS. 3-4, the male connector can be attached to the microphone and the female connector can be attached to the speaker. Other type of connections that provide both mechanical and electrical connections can be used. Additionally, other connectors can be used to position the microphone on the face side of a face barrier without also providing an electrical connection to the speaker, such as a straight pin, clasp, clip, adhesive, etc.

FIG. 2 illustrates a diagram showing a top view of an example of a face barrier communication system 200 employed with face barrier 100 and a mask support 104, constructed according to the principles of the disclosure. The face barrier communication system 200 includes microphone 230, speaker 240, and talk circuit 250. Microphone 230 and speaker 240 can be conventional components and can be similarly configured and include the same functionality as microphone 130 and speaker 140. Mask support 114 is a support that separates the face barrier 110 from a user's face and can be used to create space between user's mouth and microphone 230.

Talk circuit 250 is similarly configured as talk circuit 150. As such, talk circuit 250 includes an electrical conductor (or conductors) that carries converted sound pressure to the speaker 240. The talk circuit 250 is rigid or within a rigid connector used to affix the microphone 230 and speaker 240 to each other and to the face barrier 110 and/or mask support 114. Rigid connection system 300 is an example that can be used for the connection. A mounting location through both the face barrier 110 and the mask support 114 is shown. Additionally, a mounting location just through the face barrier 110 is illustrated.

FIG. 3 illustrates a diagram of an example of connecting a microphone and speaker together using a rigid connection system 300 according to the principles of the disclosure. The rigid connection system 300 can be used to connect microphone 230 and speaker 240 together through face barrier 110 and/or face barrier 110 and mask support 114. Microphone 230 and speaker 240 will be used as an example with the rigid connection system 300. The rigid connection system 300 includes a first connector 310 and a corresponding second connector 320. The first connector 310 can be a male connector and the second connector 320 can be corresponding female connector. As such, the first connector 310 can connect to the second connector 320 by pushing the male connector into the female connector. The first and second connectors 310, 320, can include internal corresponding ridges (not shown) to secure the connection when pushed together, help compensate for different face barrier widths, and align connection of the talk circuit 250 located in each of the first and second connectors 310, 320. Other types of aligners or locks can also be used to secure the connection. The first connector 310 can be pushed through a face barrier, such as face barrier 110, at a desired location to connect to the second connector 320. As such, the rigid connection system 300 can be used to affix communication system 200 to the face barrier 110 and also connect talk circuit 250 between the microphone 230 and speaker 240.

The talk circuit 250 is represented by dashed lines within the two sections of the rigid connection system 300. The talk circuit 250 can be concentric conductors within the rigid connectors 310, 320. The talk circuit 250 is connected when the first and second connectors 310, 320, are joined. As noted, an alignment mechanism, such as a notch, can be used to ensure alignment and connection of the talk circuit 250. The first and second connectors 310, 320, can be constructed of non-electrical conducting material and the talk circuit 250 can be located within the first and second connectors 310, 320. The talk circuit 250 can be integrated within the first and second connectors 310, 320.

FIG. 4 illustrates a diagram of another example of connecting microphone 230 and speaker 240 together through face barrier 110 according to the principles of the disclosure. A rigid connection system 400 is illustrated that includes a first connector 410 and a second connector 420 that can connect together using corresponding threads. A small hole through the face barrier 110 can be used or one of the first or second connectors can have a sharp point (such as in FIG. 3) to allow pushing through the face barrier 110. Talk circuit 250 is not shown in FIG. 4. First connector 410 can be a male connector and second connector 420 can be a female connector. For both rigid connection systems 300 and 400, the female and male connectors can be used with either microphone 230 or speaker 240.

Rigid connection system 400 also includes stabilizers 430. The stabilizers 430 can be used to provide spacing between the microphone 230 and the face barrier 110 and/or the speaker 240 and the face barrier 110. The stabilizers 430 can be connected to the outside circumference of the rigid first and/or second connectors 410, 420. The stabilizers 430 can be permanently or removeably connected via, for example, a mechanical, friction, adhesive, or another type of connection, including conventional connections. The stabilizers 430 can be of a sufficiently rigid material to allow the two components of the rigid connector to be connected by, for example, pushing the stabilizers 430 together with the face barrier 110 therebetween.

As noted above, in addition to the face barrier communication system including the microphone, the talk circuit, and the speaker, the communication system can also include additional components. FIG. 5 illustrates a block diagram of an example of a face barrier communication system that includes a wireless talk circuit 500. For example, instead of a hardwired talk circuit 550 represented by the solid line in FIG. 5, the talk circuit can be wireless. As such, a wireless transmitter 510 and receiver 520 can form wireless talk circuit 500 and be connected to microphone 530 and speaker 540 for wireless transmission. An antenna (not shown) of the wireless transmitter 510 can extend outside of the face barrier 110. The wireless communication via the wireless talk circuit 500 can be a short-range wireless communication system that uses, for example, Bluetooth, near field, Zigbee, ultraband, etc., compliant technology and components.

The wireless talk circuit 500 can also include an amplifier 560 for amplifying the electrical signals from the microphone 530 and a power source 570 to provide power for the amplification. The power source can be a battery. The amplifier 560 and the power source 570 can be connected to the wireless 500 or hardwired talk circuit 550. The amplifier 560, power supply 570, wireless transmitter 510, and wireless receiver 520 can be conventional devices. The microphone 530 and speaker 540 can also be conventional devices. The microphone 530, speaker 540, and talk circuit 550 can correspond and be configured as the microphone 230, the speaker 240, and the talk circuit 250. The one or more of the devices can be sized to fit and operate within the environment of a face barrier worn by a user.

The location of the wireless transmitter 510 and receiver 520, the amplifier 560, and the power supply 570 can vary. For example, the amplifier 530 and power supply 570 can be located external from the face barrier 510 (e.g., not connected to the face barrier), such as attached to clothing of a user, or even in a pocket of a user's clothing. While the microphone 530 is positioned on the face side of the face barrier 110 to receive user sound without the muffling of the face barrier, the location of the speaker 540 on the public side can also vary. For example, the speaker can also attach to a user's clothing.

Figure 6:
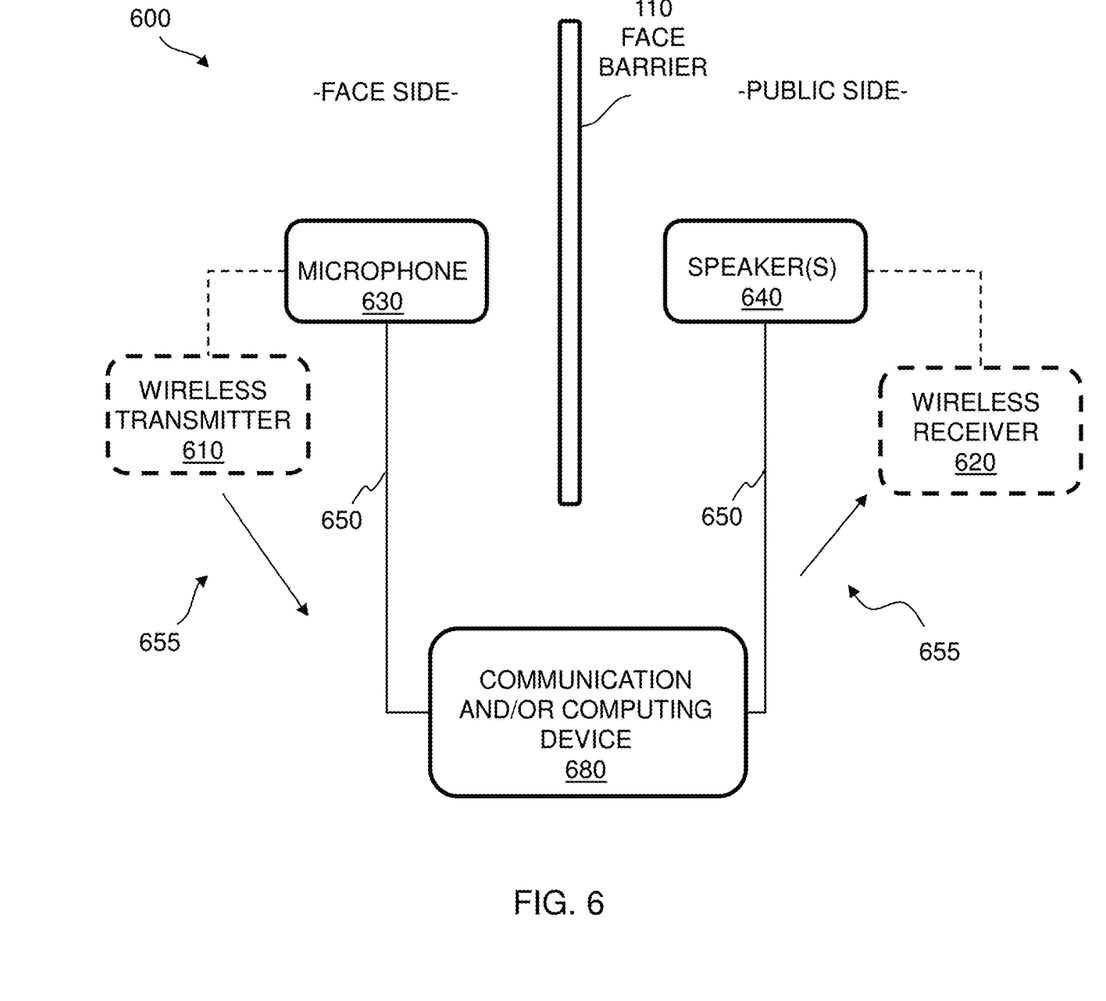
FIG. 6 illustrates a diagram of another example of a face barrier communication system having a microphone behind a face barrier according to the principles of the disclosure.

FIG. 6 illustrates a diagram of another example of a face barrier communication system 600 having microphone 630 behind face barrier 110 according to the principles of the disclosure. In FIG. 6, microphone 630 is communicatively coupled to a communication and/or computing device 680, such as a smart phone, via a hardwired 650 or wireless 655 talk circuit. For a wireless connection, wireless transmitter 610 can be tuned to communicate with the communication/computing device 680 (hereafter referred to as computing device) via, for example, Bluetooth or another type of short range wireless connection. The computing device 680 can receive the electrical signals from the microphone 630 via the wired or wireless connection and can send corresponding signals to speaker 640 or speakers associated with the computing device 680. The speaker(s) 640 can be integrated speaker(s) of the computing device 680 or can be wired or wirelessly coupled to the computing device 680, such as ear phones. For example, the user with the microphone 630 can be a hair stylist and a client of the stylist can have the computing device 680. The wireless transmitter 610 can be tuned to communicate with the computing device 680 of the client and the client can hear the stylist though the speaker(s) 640 of their computing device 680. The speaker(s) 640 can be one or more ear speakers or ear pods that are wirelessly or hardwired connected to the client's computing device 640. In some examples the wireless transmitters and receivers can be transceivers, such as, for also communicating with the computing device. In another example, the computing device 680 can be a computing tablet or pad that is used to submit orders and the user with the microphone 630 can be a waiter or waitress. An integrated speaker 640 of the computing device 680 can be can allow the waiter or waitress to communicate more clearly with the customers; especially when taking orders.

The computing device 680 could be associated with the user and the user's computing device 680 is then communicatively coupled, wirelessly or hardwired, to the speaker(s) 640 of the other person. Continuing the stylist-client example, the microphone 630 of the stylist can be communicatively coupled to their computing device 680 that is communicatively coupled to the speaker(s) 640 of the client, such as speakers in the ear(s) of the client. Regardless the configuration, the client can also have a microphone behind their face barrier that is communicatively coupled to speaker(s) of the stylist. Accordingly, behind-the-face barrier communication can occur both ways with reduced, limited or possibly no interference from the face barriers. In some examples, a single computing device can be used to complete and manage the talk circuits from the microphone of the stylist to the client's speaker(s), and from the microphone of the client to the stylist's speaker(s). Each of the different configurations of the communication systems disclosed herein, including the examples of FIG. 1A to FIG. 4, can provide improved communication between the stylist and client. An application on the computing device, such as a mobile application, can be used to connect the microphone(s) and speaker(s) for communication. The application can be used to convert audio communications between two computing devices, such as smart phones, that is typically via cellular communication to short range communication, such as Bluetooth.

Figure 7:
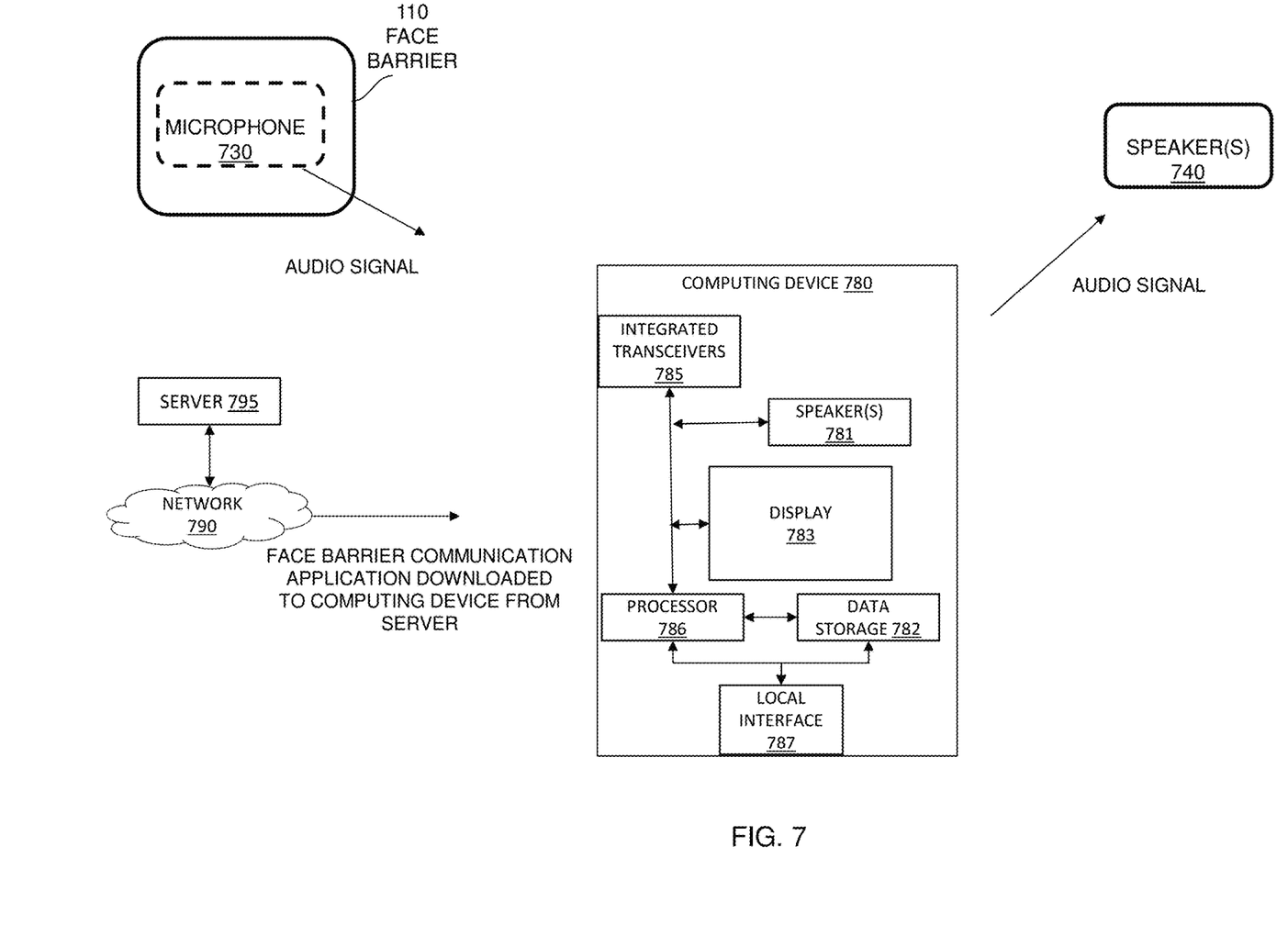
FIG. 7 illustrates a block diagram of an example of a face barrier communication system constructed according to the principles of the disclosure.

FIG. 7 illustrates a block diagram of example of a communication system 700 constructed according to the principles of the disclosure. The communication system 700 includes a microphone 730, a speaker(s) 740, a computing device 780, a communications network 790, and a server 795. The microphone 730 can be behind a face barrier 110.

The computing device 780 is configured to communicatively couple the microphone 730 to the speaker(s) 740. As such, the computing device 780 is configured to receive an audio signal (e.g., electrical signals) from the microphone 710, for example representing sound received from and/or generated behind the face barrier 110, and transmit a corresponding signal to the speaker(s) 740. The speaker(s) 740 can be external to the computing device 780 or can be integrated speakers 781 with the computing device 780. The computing device 780 can be a mobile communication device having mobile communication capability. The computing device can be, for example, a smartphone, computing pad, tablet, or another portable computing device. The computing device 780 can be configured and/or capable of communicating via the communications network 790 to the server 795. The computing device 780 has an application stored thereon, such as in data storage 782, that is used to configure transmission of audio from the microphone 730 to the speaker(s) 740. The application can be a mobile application.

For example, a smart phone configured (i.e., designed and constructed) for communication, can be employed to provide the audio connection between the microphone 730 and the speaker(s) 740. A user can download the application from the server 795 and use the application to set-up the coupling between the microphone 730 and the speaker(s) 740. The application, e.g., a face barrier communication application, can allow a user to connect (via a user interface such as display 783 and a keypad (not shown)) the microphone 730 to the computing device 780 and select a speaker(s), such as speaker(s) 740 or speaker(s) 781, to receive the audio signals from the microphone 730. For example, the computing device 780 can detect the microphone 730 as a Bluetooth connected device (or another type of connected device) and ask the user if they want to select the connected microphone as an input device, such as for a face barrier communication system. The computing device 780 can then identify one or more Bluetooth connected speaker(s) and ask the user which one or more of the speakers the user would like to select as the output device(s) for the microphone 730. The speakers can be a selected pair, such as a one for each ear. Once selected, the computing device 780 can then apply the incoming Bluetooth signal from the microphone 730 as an output audio signal to the selected speaker(s), such as speaker(s) 740. As noted above, more than one speaker can be selected. As such, a microphone 730 behind a face barrier of a user can be coupled to different speakers associated with different people. The application on the same computing device 780 can also be used to establish communication back to the user having the microphone 730. Alternatively, another computing device having the application can be similarly used as described above.

In addition to at least one speaker 781, the computing device 780 also includes the display 783, one or more integrated transceivers 785, a processor 786, and a local interface 787. The computing device 780 can include additional components that are typically included in such devices. Each of the components of the computing device 780 can be coupled together via conventional connectors, busses, interfaces, etc. The display 783, data storage 782, integrated transceivers 785, processor 786, and local interface 787 can be configured to operate as in a conventional device. Additionally, the computing device 780, can perform additional functions according to a communication application loaded on the data storage 782 to provide improved communication between at least two people, such as face barrier communication. Accordingly, at least some of the components of the computing device are configured to cooperate to provide the additional functionality disclosed herein. The application can direct operation of the processor 786 to perform the various functions for the improved communication. For example, the processor 786 can cooperate with a Bluetooth portion of the integrated transceivers 785 to decrypt a received signal from the microphone 730 and provide the decrypted signal to the at least one of the speakers 740, 781. In some examples, the application can couple microphones from more than one user to speakers associated with more than one user. In other words, a single application can be used to establish communication from a microphone of one user to a speaker(s), a microphone of another user to speaker(s), a microphone of yet another user to speaker(s), etc. Establishing the communication connection (the talk circuit) can be based on the microphones and speakers being within range of the computing device having the application, which can be determined on the type of wireless protocol that is used. In some examples, multiple microphones can be connected to the same speaker(s) and the application can be used to control transmission of the audio to prevent or at least reduce the microphones from talking over each other. For example, the application can be used to direct the processor 786 to coordinate delivery of the audio signals (e.g., delays one or more) to prevent overtalk.

The one or more integrated transceivers 785 (hereinafter referred to as integrated transceivers) transmit and receive data over one or more communications network. One or more of the integrated transceivers 785 include a native chip set that processes the data for communicating, i.e., transmitting and receiving, such as for cellular communications. Additionally, at least one of the integrated transceivers are configured to receive the audio signal from the microphone 730 via a short range communication protocol, such as via a Bluetooth compliant network. As such, the integrated transceivers 785 can receive the audio signals and can also transmit, or forward, the audio signals employing an application that has been loaded onto the computing device 780 from the server 795. The application can interface via the display 783, or another user interface not shown (such as a keypad or audio activated interface), with a user to direct the communicative coupling with the one or more speakers. As noted above the application can be stored in the data storage 782. The data storage 782 can be a memory or memories, such as included in conventional computing devices.

In some examples, the local interface 787 can be used to receive the audio signal from the microphone 730, such as via a cable connection. In other examples, the local interface 787 can connect via a cable with the external speakers 740 and the audio signal from the microphone 730 can be wirelessly received. The local interface 787 can be, for example, a USB compliant connection and a USB compliant connector can be used.

The communications network 790 is a network wherein the last link can be wireless. For example, the communications network 790 can be or can include a cellular network or mobile network that is used by mobile communication devices, such as cell phones. The communications network 790 can be a conventional network used for audio communications. A portion of the communications network 790 can also include a wireless local area network (WLAN). In some examples, the computing device 780 can receive the audio signal from the microphone 730 via a WLAN and can provide the audio signal to the speaker(s) 740 via a WLAN. As noted above, the local interface 787 can be used in some example to connect to the communications network 790.

Figure 8:
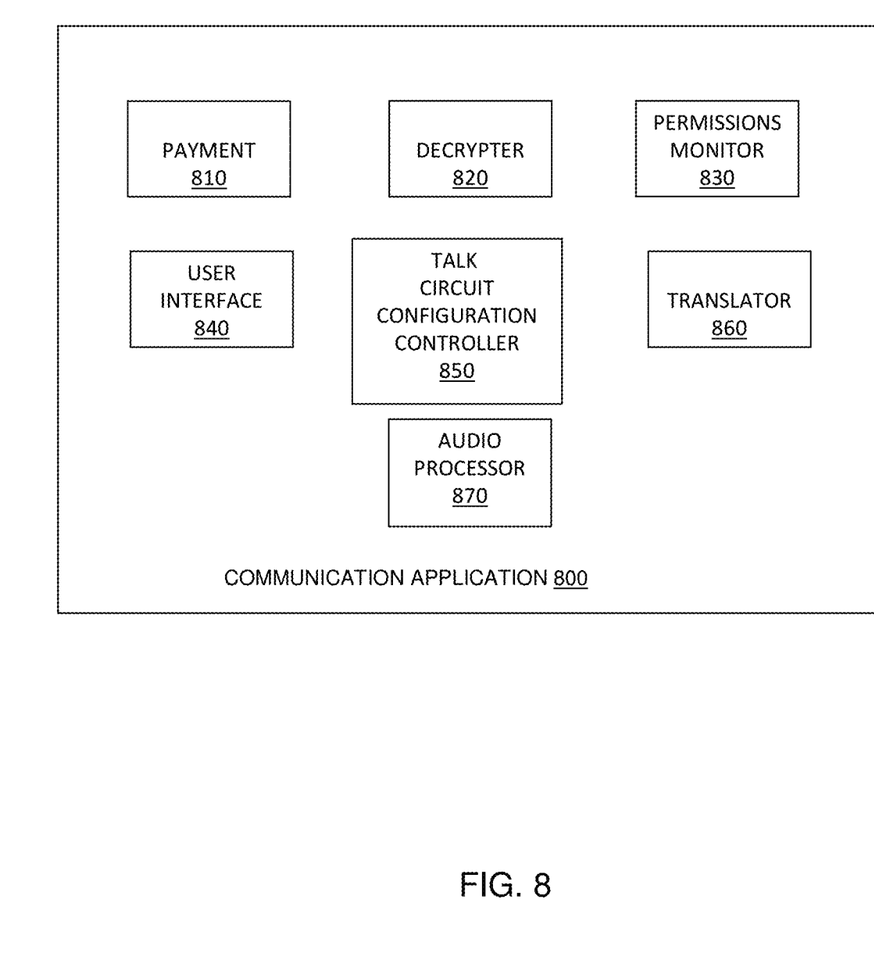
FIG. 8 illustrates a block diagram of an example of an application providing functions according to the principles of the disclosure.

FIG. 8 illustrates a block diagram of an example of an application 800 providing functions according to the principles of the disclosure. The application 800 can be a computer program stored on a data storage of a computing device, such as the computing device of FIG. 6 or 7. The application 800 can be a computer program product that is loaded, such as downloaded, on a computing device. The application can perform various functions according to operating instructions that represent an algorithm or algorithms. The functions can correspond to those described above for establishing connection between the microphone and speaker(s) according to a face barrier communication application. The functions can connect a microphone associated or connected to a first computing device to a speaker or speakers associated or connected to a second computing device or devices via a short range connection, such as via a Bluetooth connection, and vice versa (the microphones associated with the second computing device or devices to a speaker of speakers of the first computing device). The computing devices can be smart phones. As such, communications that are typically intended for cellular and/or satellite communications can be converted or used as short range wireless communications.

The application 800 has a payment section that indicates payment has been received for the application 800 and can be used for connecting the microphone and speaker(s). The application 800 can also include a decrypter 820 that provides decryption key for decrypting received short range broadcast signals. The decrypt key can be sent from a server, such as in FIGS. 7, to the computing device via the application 800. The decryption keys can be provided for a certain time period, certain locations, certain number of people, etc. The decrypt key can be a kilobyte or 3-5 kilobyte file that has the decrypt key for a particular location, such as a salon or restaurant. In some examples, a key, e.g., a master key, can be used for multiple locations, such as multiple salons or restaurants, based on a subscription or permission level. The master key can be dedicated for a specific computing device. In case devices are changed, the server can keep track of active computing devices based on identification data of a user. The keys, therefore, can be hard keyed to the I.D. code for a computing device. So even if the application is stolen, the thief will not be able to use it to use the communication application.

The application 800 can include a permissions monitor 830 that controls what permission level has been purchased and can also indicate what is included in the different permission levels. A user can then upgrade using the application 800. In some example, a user can also purchase an upgrade or service for another computing device. The application 800 can also include a user interface 840 that controls communication between a user and the computing device to setup a talk circuit or circuits between microphones and speakers. The user interface 840 can cooperate with a talk circuit configuration controller 850 portion of the application 800 that can be used to select the microphone(s) and speaker(s) to connect and allow other controls for the communication. For example, prioritize users to avoid or limit overtalk in case multiple microphones are assigned to the same speaker(s). The user interface 840 can also interact with a processor or controller of the computing device to allow a user to adjust the volume of the audio delivered. The user interface 840 can further interact with a translator 860 portion of the application to select a language for translating the sound from the user. The translator 860 can be from another vendor and the translator can provide an interface to select the translator to perform the desired language translation. The other vendor translators can also be applications that are downloaded from the server. The application 800 can also include an audio processor 870 that "cleans-up" the electrical signal from the microphone before sending the audio to the speaker. The audio processor 870 can be a conventional audio processor. In some examples, an audio processor integrated with the computing device (such as with a smart phone) can be employed for processing the audio signal.

A portion of the above-described apparatus, systems or methods may be embodied in or performed by various analog or digital data processors, wherein the processors are programmed or store executable programs of sequences of software instructions to perform one or more of the steps of the methods. The processors can be parallel processors such as GPUs, serial processors such as CPUs, or a combination thereof. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

What is claimed:

1. A communication system, comprising:
a first microphone; and
a first computing device configured to receive a first audio signal from the first microphone and transmit the first audio signal to a first speaker, and configured to receive a second audio signal from a second microphone different than the first microphone and transmit the second audio signal to a second speaker that is different than the first speaker, wherein each receive and transmit is via a short range wireless communication system and a single computing device, wherein the first computing device is the single computing device.

2. The communication system as recited in claim 1, wherein the short range wireless communication system is a Bluetooth compliant system.

3. The communication system as recited in claim 1, wherein at least one of the first speaker or the second microphone are selected via an application executing on the first computing device.

4. The communication system as recited in claim 3, wherein at least one of the second speaker or the first microphone are selected via the application executing on the first computing device.

5. The communication system as recited in claim 4, wherein the first computing device is a mobile computing device.

6. The communication system as recited in claim 5, wherein the mobile computing device is a smartphone.

7. The communication system as recited in claim 1, wherein the first microphone and the second speaker are associated with a first user and the first speaker and the second microphone are associated with a second user that is different than the first user.

8. The communication system as recited in claim 1, wherein an application executing on the single computing device establishes connections between the first microphone and the first speaker for the first audio signal and the second microphone and the second speaker for the second audio signal, wherein the application further coordinates delivery of the first audio signal and the second audio signal.

9. The communication system as recited in claim 8, further comprising additional microphones and additional speakers, wherein the application further coordinates delivery of audio signals between the additional microphones and the additional speakers.

10. A communication system, comprising:
a first microphone associated with a first user;
at least a first speaker associated with a second user; and
a first computing device configured to receive a first audio signal from the first microphone and transmit the first audio signal to the at least first speaker, wherein each receive and transmit is via a Bluetooth compliant system and the single computing device, wherein the first microphone and the at least first speaker are selected by the first user via an application executing on a single computing device that is the first computing device.

11. The communication system as recited in claim 10, where the application is further configured to establish a connection between the first microphone and the at least first speaker after being selected.

12. The communication system as recited in claim 10, wherein the communication system includes multiple speakers and microphones that are each selected via the application.

13. The communication system as recited in claim 12, wherein the application coordinates audio signals between the multiple microphones and multiple speakers.

14. The communication system as recited in claim 10, wherein the first computing device is a mobile computing device.

15. A communication system, comprising:
a first microphone associated with a first user; and
a smart phone configured to receive a first audio signal from the first microphone and transmit the first audio signal to a first speaker associated with a second user, and configured to receive a second audio signal from a second microphone associated with the second user and transmit the second audio signal to a second speaker associated with the first user, wherein each receive and transmit is via a short range wireless communication system and a single computing device, wherein the smart phone is the single computing device.

16. The communication system as recited in claim 15, wherein the first and second microphone and the first and second speaker are selected by the first user using an application executing on the smart phone.

17. The communication system as recited in claim 15, wherein the application coordinates delivery of the first and the second audio signals.

\* \* \* \* \*